(12) United States Patent
Ogawa et al.

(10) Patent No.: US 10,297,867 B2
(45) Date of Patent: May 21, 2019

(54) SHEET-LAMINATED LITHIUM ION SECONDARY BATTERY AND PRODUCTION METHOD FOR SHEET-LAMINATED LITHIUM ION SECONDARY BATTERY

(71) Applicant: SEKISUI CHEMICAL CO., LTD., Osaka (JP)

(72) Inventors: Hiroshi Ogawa, Tsukuba (JP); Masaru Heishi, Toride (JP); Mitsuhide Nogami, Kusatsu (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 170 days.

(21) Appl. No.: 15/126,022

(22) PCT Filed: Mar. 19, 2015

(86) PCT No.: PCT/JP2015/058340
§ 371 (c)(1),
(2) Date: Sep. 14, 2016

(87) PCT Pub. No.: WO2015/141799
PCT Pub. Date: Sep. 24, 2015

(65) Prior Publication Data
US 2017/0092986 A1    Mar. 30, 2017

(30) Foreign Application Priority Data
Mar. 19, 2014  (JP) .................. 2014-056854

(51) Int. Cl.
*H01M 10/0585* (2010.01)
*H01M 2/02* (2006.01)
(Continued)

(52) U.S. Cl.
CPC ....... *H01M 10/0585* (2013.01); *H01M 2/021* (2013.01); *H01M 2/168* (2013.01);
(Continued)

(58) Field of Classification Search
CPC .. H01M 10/0585; H01M 4/366; H01M 2/168; H01M 10/0436; H01M 10/0525; H01M 2/021; H01M 2220/30
See application file for complete search history.

(56) References Cited

U.S. PATENT DOCUMENTS 9,941,520 B2 *  4/2018  Park ................. H01M 4/667
2002/0090555 A1 *  7/2002  Noh ................. H01M 10/052
429/303

(Continued)

FOREIGN PATENT DOCUMENTS

EP    1022798 A2    7/2000
EP    1445806 A1    8/2004
(Continued)

OTHER PUBLICATIONS

Extended European Search Report in EP 15764437.8, dated Sep. 25, 2017.

(Continued)

*Primary Examiner* — Stewart A Fraser
(74) *Attorney, Agent, or Firm* — Greenblum & Bernstein, P.L.C.

(57) ABSTRACT

A sheet-laminated lithium ion secondary battery comprising: a membrane electrode assembly which comprises a cathode sheet comprising a cathode current collector having formed thereon a cathode active material layer, and an anode sheet comprising an anode current collector having formed thereon an anode active material layer, the cathode sheet and the anode sheet being laminated through a separator; and a sheet outer casing having accommodated therein the membrane electrode assembly, wherein, in the membrane electrode assembly, a sheet thermoplastic resin layer is inserted (Continued)

as at least one of an interlayer between the cathode sheet and the separator, and an interlayer between the anode sheet and the separator.

11 Claims, 3 Drawing Sheets

(51) Int. Cl.
  *H01M 2/16*   (2006.01)
  *H01M 4/36*   (2006.01)
  *H01M 10/04*   (2006.01)
  *H01M 10/0525*   (2010.01)
  *H01M 10/052*   (2010.01)

(52) U.S. Cl.
  CPC ....... *H01M 4/366* (2013.01); *H01M 10/0436* (2013.01); *H01M 10/0525* (2013.01); *H01M 10/052* (2013.01); *H01M 2220/30* (2013.01)

(56) References Cited

U.S. PATENT DOCUMENTS

| | | | |
|---|---|---|---|
| 2008/0155813 A1 | 7/2008 | Dopp et al. | |
| 2012/0237747 A1* | 9/2012 | Tai | B32B 27/08 428/216 |
| 2013/0054061 A1* | 2/2013 | Nishimoto | H01M 2/1653 701/22 |
| 2013/0309566 A1* | 11/2013 | Umehara | H01M 4/13 429/211 |
| 2014/0134487 A1* | 5/2014 | Itaya | H01M 2/16 429/211 |
| 2016/0043375 A1* | 2/2016 | Saitoh | H01M 2/202 429/152 |

FOREIGN PATENT DOCUMENTS

| | | |
|---|---|---|
| EP | 2 477 252 | 7/2012 |
| JP | 2002-8730 | 1/2002 |
| JP | 2002-50404 | 2/2002 |
| JP | 2006-172777 | 6/2006 |
| JP | 2010-153140 | 7/2010 |
| JP | 2010-287456 | 12/2010 |
| JP | 2012-74367 | 4/2012 |
| JP | 2012-529753 | 11/2012 |
| JP | 2013-225388 | 10/2013 |
| JP | 2013-251119 | 12/2013 |
| WO | 2010/070424 A1 | 6/2010 |
| WO | 2012/153847 A1 | 11/2012 |

OTHER PUBLICATIONS

International Search Report, along with English-language translation thereof, in PCT/JP2015/058340 dated Jun. 16, 2015.

* cited by examiner

SHEET-LAMINATED LITHIUM ION SECONDARY BATTERY AND PRODUCTION METHOD FOR SHEET-LAMINATED LITHIUM ION SECONDARY BATTERY

TECHNICAL FIELD

The present invention relates to a sheet-laminated lithium ion secondary battery, and a production method for a sheet-laminated lithium ion secondary battery.

Priority is claimed on Japanese Patent Application No. 2014-056854, filed Mar. 19, 2014, the contents of which are incorporated herein by reference.

BACKGROUND ART

A lithium ion secondary battery has characteristic high energy density and electromotive power as compared to a lead storage battery or a nickel-hydrogen battery; therefore, a lithium ion battery has been widely used as a power supply for various portable devices which are demanded to be smaller in size and lighter in weight, and laptop computers. Such a lithium ion secondary battery is generally produced by a method in which a cathode sheet formed of a cathode current collector coated with a cathode active material and an anode sheet formed of an anode current collector coated with an anode active material are laminated through a separator and an electrolyte which are provided therebetween, and the resultant laminate of the cathode sheet, the separator and the anode sheet is sealed within a casing together with the electrolyte. The electrolyte may be a gel electrolyte as well as a liquid or solid electrolyte.

The lithium ion secondary batteries are available in the form of a cylinder, a can or a laminated pack, and, recently, a sheet lithium ion secondary battery having a laminated structure is also proposed.

In the case of a lithium ion secondary battery in the form of a sheet, when the sheet battery is bent to curve, a displacement occurs due to winding between the cathode, the separator and the anode which are laminated one upon the other. Here, as shown in FIG. 5, a plurality of bent portions 101 occur on the surface of the lithium ion secondary battery 100, and the displacement of layers occurring at the bent portions causes the electrode disposed on the inner side of the curve to be sagged, thereby varying the distance between the electrodes here. Therefore, the distance between the electrodes is not uniform inside the lithium ion secondary battery 100, and gaps occur between the respective electrodes and the separator. This causes a problem of deterioration of battery performance, such as the lowering of capacity retention characteristics.

As a lithium ion secondary battery in the form of a sheet as described above, there is proposed a battery in which the respective electrode sheets and the separator are tightly joined by bonding with a solvent-type adhesive (see, for example, Patent Document 1).

According to the lithium ion secondary battery described in Patent Document 1, the electrode sheets and the separator are bonded through an adhesive layer, whereby the flexibility of the bent and curved lithium ion secondary battery are ensured, and the loosening or displacement of the mutual contact between the electrode sheets and the separator can be suppressed.

PRIOR ART REFERENCES

Patent Document

Patent Document 1: Japanese Unexamined Patent Application Publication No. 2002-50404

DISCLOSURE OF INVENTION

Problems to be Solved by the Invention

However, in the lithium ion secondary battery described in Patent Document 1, the respective electrode sheets and the separator are bonded with each other using a solvent-type adhesive; therefore, the drying of the adhesive is required, whereby the manufacturing steps are increased while decreasing the productivity, and the manufacturing cost is increased as well.

The present invention has been made in view of the above situation, and the purpose of the present invention is to provide a sheet-laminated lithium ion secondary battery which can secure a uniform distance between the electrodes even when the battery is bent and curved, such that a high battery performance can be maintained, and which can be manufactured with a high productivity at a low cost.

Means to Solve the Problems

The invention described in claim 1 is a sheet-laminated lithium ion secondary battery characterized in that the battery comprises: a membrane electrode assembly which comprises a cathode sheet comprising a cathode current collector having formed thereon a cathode active material layer, and an anode sheet comprising an anode current collector having formed thereon an anode active material layer, the cathode sheet and the anode sheet being laminated through a separator; and a sheet outer casing having accommodated therein the membrane electrode assembly, wherein, in the membrane electrode assembly, a sheet thermoplastic resin layer is inserted as at least one of an interlayer between the cathode sheet and the separator, and an interlayer between the anode sheet and the separator.

According to the present invention, the sheet-laminated lithium ion secondary battery has a construction in which a sheet thermoplastic resin layer is inserted as at least one of an interlayer between the cathode sheet and the separator, and an interlayer between the anode sheet and the separator; therefore, even when the battery is bent to curve, the distance between the electrodes can be kept uniform due to the expansion and contraction of the thermoplastic resin layer. As a result, the occurrence of a gap between the electrodes and the separator can be prevented while maintaining the good flexibility of the sheet electrodes, whereby it becomes possible to prevent the electron transfer between the electrodes from being cut off or from being hindered, which results in the improvement of the capacity maintenance property of the battery. Further, the use of sheet thermoplastic resin layer makes it possible to omit additional steps such as a drying step, thereby improving the productivity. Thus, it becomes possible to provide a sheet-laminated lithium ion secondary battery which not only is capable of maintaining a high battery performance, but also can be produced at a low cost and with a high productivity.

The invention described in claim 2 is the sheet-laminated lithium ion secondary battery according to claim 1, wherein the thermoplastic resin layer has an ion permeability.

According to this invention, since the thermoplastic resin layer has an ion permeability, an excellent battery performance can be achieved.

The invention described in claim 3 is the sheet-laminated lithium ion secondary battery according to claim 1 or 2, which further comprises a sheet thermoplastic resin layer inserted as at least one of an interlayer between the cathode sheet and the outer casing, and an interlayer between the anode sheet and the outer casing, at among interfaces present between the membrane electrode assembly and the outer casing.

According to the present invention, the sheet thermoplastic resin layer is also provided between each of the electrode sheets and the outer casing; therefore, even when the sheet-laminated lithium ion secondary battery is bent to curve as mentioned above, the distance between the electrodes can be kept uniform, whereby the effect of maintaining the excellent battery performance becomes more remarkable.

The invention described in claim 4 is the sheet-laminated lithium ion secondary battery according to any one of claims 1 to 3, wherein the thermoplastic resin layer inserted as the interlayer is heat fusion bonded to upper and lower layers.

According to the present invention, each sheet thermoplastic resin layer is heat fusion bonded to upper and lower layers; therefore, even when the sheet-laminated lithium ion secondary battery is bent to curve, the stress caused by the displacement of the sheets (electrodes and separator) due to winding inside the battery can be alleviated by the elasticity of the sheet thermoplastic resin layer, whereby the effect of maintaining the excellent battery performance by keeping the distance between the electrodes uniform becomes further more remarkable.

The invention described in claim 5 is a method for producing the sheet-laminated lithium ion secondary battery described in claim 1, which comprises a step of heat fusion bonding a sheet thermoplastic resin layer as at least one of an interlayer between the cathode sheet and the separator, and an interlayer between the anode sheet and the separator.

According to the present invention, each sheet thermoplastic resin layer is heat fusion bonded between the electrode sheets and the separator; therefore, even when the sheet-laminated lithium ion secondary battery is bent to curve, the stress caused by the displacement of the sheets (electrodes and separator) due to winding thereof inside the battery can be alleviated by the elasticity of the sheet thermoplastic resin layer, whereby the effect of maintaining the excellent battery performance by keeping the distance between the electrodes uniform becomes remarkable.

Effect of the Invention

According to the sheet-laminated lithium ion secondary battery of the present invention, the following effects can be achieved by the above-mentioned means for solving the problems.

Specifically, according to the present invention, the sheet-laminated lithium ion secondary battery has a construction in which a sheet thermoplastic resin layer is inserted as at least one of an interlayer between the cathode sheet and the separator, and an interlayer between the anode sheet and the separator; therefore, even when the battery is bent to curve, the distance between the electrodes can be kept uniform due to the expansion and contraction of the thermoplastic resin layer. As a result, the occurrence of a gap between the electrodes and the separator can be prevented while maintaining the good flexibility of the sheet electrodes, whereby it becomes possible to prevent the electron transfer between the electrodes from being cut off or from being hindered, which results in the improvement of the capacity maintenance property of the battery.

Further, the use of sheet thermoplastic resin layer makes it possible to omit additional steps such as a drying step, thereby improving the productivity.

Thus, it becomes possible to provide a sheet-laminated lithium ion secondary battery which not only is capable of maintaining a high battery performance, but also can be produced at a low cost and with a high productivity.

BEST MODE FOR CARRYING OUT THE INVENTION

Figure 1A:
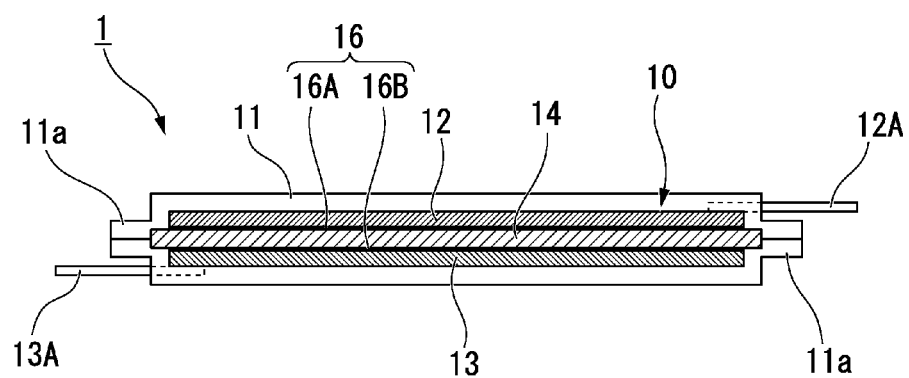
FIG. 1A is a schematic view explanatorily showing an embodiment of the sheet-laminated lithium ion secondary battery of the present invention, and is a cross-sectional view thereof taken along the line A-A of FIG. 1B for explaining the layered structure including the thermoplastic resin layer.
Figure 1B:
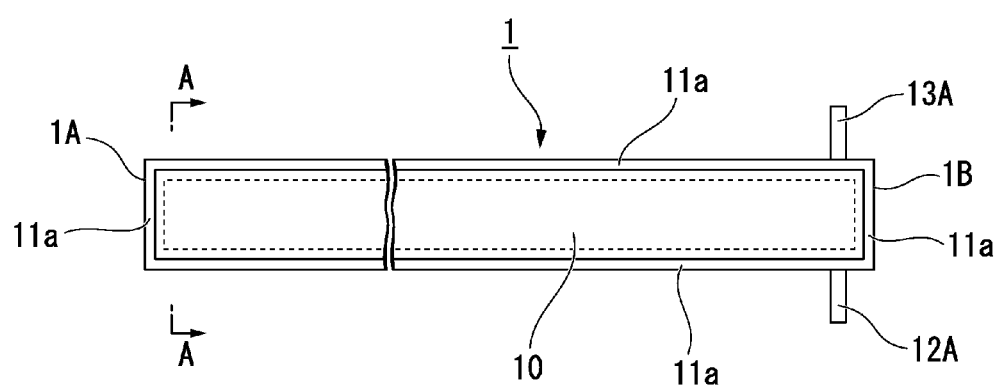
FIG. 1B is a plan view of the sheet-laminated lithium ion secondary battery shown in FIG. 1A.

Hereinbelow, explanations are made on embodiments of the sheet-laminated lithium ion secondary battery of the present invention, referring to the drawings. The present embodiment is explained below taking as an example the sheet-laminated lithium ion secondary battery in which a membrane electrode assembly having a cross-section as shown in FIG. 1A is packaged in a long sheet outer casing as shown in FIG. 1B.

[Construction of Sheet-Laminated Lithium Ion Secondary Battery]

The sheet-laminated lithium ion secondary battery 1 of the present embodiment comprises: a membrane electrode assembly 10 which comprises a cathode sheet 12 comprising a cathode current collector having formed thereon a cathode active material layer, and an anode sheet 13 comprising an anode current collector having formed thereon an anode active material layer, the cathode sheet 12 and the anode sheet 13 being laminated through a separator 14; and a sheet outer casing 11 having accommodated therein the membrane electrode assembly 10. In the membrane electrode assembly 10 of the sheet-laminated lithium ion secondary battery 1, a sheet thermoplastic resin layer 16 is inserted as at least one of an interlayer between the cathode sheet 12 and the separator 14, and an interlayer between the anode sheet 13 and the separator 14. In the example shown in FIG. 1A, a sheet thermoplastic resin layer 16A is inserted as an interlayer between the cathode sheet 12 and the separator 14, and a sheet thermoplastic resin layer 16B is inserted as an interlayer between the anode sheet 13 and the separator 14.

Hereinbelow, detailed explanations are made on each of the layers constituting the sheet-laminated lithium ion secondary battery 1.

FIG. 1A is a cross-sectional view showing a layered structure of the sheet-laminated lithium ion secondary battery 1, and FIG. 1B is a plan view of the sheet-laminated lithium ion secondary battery 1.

As shown in FIG. 1A, the sheet-laminated lithium ion secondary battery 1 of the present embodiment has a membrane electrode assembly 10 in which the separator 14 and an electrolyte layer (omitted in the drawing) are inserted between the cathode sheet 12 and the anode sheet 13. Further, as shown in FIGS. 1A and 1B, the membrane electrode assembly 10 is provided such that the terminal tab 12A protrudes from the end of the cathode sheet 12 on the side of the other end 1B of the sheet-laminated lithium ion secondary battery 1, while, similarly, the terminal tab 13A protrudes from the end of the anode sheet 13 on the side of the other end 1B. Each of the terminal tabs 12A and 13A may protrude in the widthwise direction of the sheet-laminated lithium ion secondary battery 1 as in the example shown in the drawings, or may protrude in the longitudinal direction of the battery 1.

In the example shown in FIG. 1B, though not shown in detail, the wiring configuration inside the sheet-laminated lithium ion secondary battery 1 is optimized such that both of the terminal tab 12A and the terminal tab 13A protrude on the side of the other end 1B; however, the present invention is not limited to this example. For example, the wiring configuration may be such that the terminal tab 12A connected to the cathode sheet 12 and the terminal tab 13A connected to the anode sheet 13 are provided to protrude at different ends, respectively, i.e., one of the tabs protrudes on the side of one end 1A, while the other one of the tabs protrudes on the side of the other end 1B.

Further, for example, the membrane electrode assembly 10 described in regards to the present embodiment has an electrolyte layer (omitted in the drawing) formed on the surface of at least one of the cathode sheet 12 and the anode sheet 13, in which the electrolyte layer is formed of a solid, liquid or gel material.

As shown in FIG. 1A and FIG. 1B, the sheet-laminated lithium ion secondary battery 1 has a structure in which the multi-layer membrane electrode assembly 10 is packaged with the outer casing 11 formed by an aluminum material, a polymer film or the like, and the outer casing 11 is sealed at its outer periphery 11a with the terminal tab 12A (connected to the cathode sheet 12) and the terminal tab 13A (connected to the anode sheet 13) protruding out of the outer casing 11.

Figure 2:
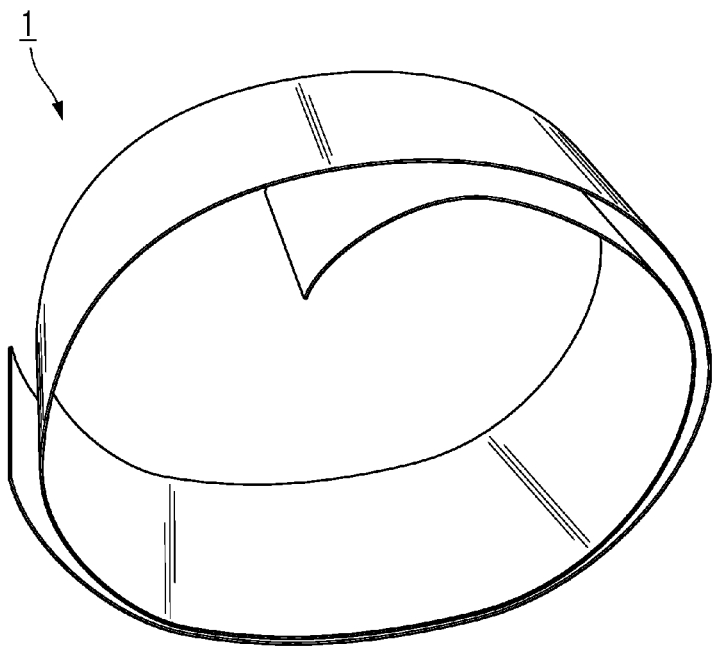
FIG. 2 is a schematic view explanatorily showing an embodiment of the sheet-laminated lithium ion secondary battery of the present invention, which is in a state of being bent to curve.

As shown in FIG. 1B and FIG. 2, for example, the sheet-laminated lithium ion secondary battery described in regards to the present invention is constructed into a form of a long sheet. For example, the sheet-laminated lithium ion secondary battery 1 has a length of approximately 50 to 2000 mm, a width of approximately 30 to 500 mm and a thickness of approximately 1 to 10 mm, and has an elongated shape in a plan view as shown in FIG. 1B.

Though details are omitted in the drawings, the cathode sheet 12 is composed of, for example, a current collector made of aluminum foil formed in an elongated shape in a plan view, and cathode active material layers formed on both sides of the current collector excluding the area of one or both ends thereof in the longitudinal direction. Further, one of the end portions in the longitudinal direction is an area for joining the terminal tab 12A.

The cathode active material layer is, for example, formed by coating the current collector with a cathode slurry in which a cathode active material, a conductive auxiliary agent and a binding agent to serve as a binder are dispersed in a solvent. For example, the cathode slurry is coated on both surfaces of the current collector at a region of the current collector between both ends thereof in the widthwise direction.

The cathode active material is not particularly limited and, for example, a metal oxide lithium compound represented by the general formula $LiM_xO_y$ (wherein M represents a metal, x and y respectively represent ratios of metal M and oxygen O) can be used. Specifically, as the metal oxide lithium compound, it is possible to use lithium cobalt oxide, lithium nickel oxide, lithium manganese oxide, ternary compounds thereof (i.e., manganese-nickel-cobalt compounds), and lithium iron phosphate.

As the conductive auxiliary agent in the cathode active material layer, for example, an acetylene black, a carbon nanofiber or the like can be used. As the binding agent, for example, polyvinylidene fluoride or the like can be used.

The terminal tab 12A of the cathode sheet 12 is joined to the cathode sheet 12 at an end thereof in the longitudinal direction so as to protrude outwardly in the widthwise direction, and is formed, for example, by an aluminum plate or the like. As mentioned above, the terminal tab 12A may protrude in the widthwise direction of the sheet-laminated lithium ion secondary battery 1 as in the example shown in the drawings, or may protrude in the longitudinal direction of the battery 1.

Though details are omitted in the drawings, as in the case of the cathode sheet 12, the anode sheet 13 is composed of, for example, a current collector made of cupper (Cu) foil formed in an elongated shape in a plan view, and anode active material layers formed on both sides of the current collector excluding the area of one or both ends thereof in the longitudinal direction. Further, one of the end portions in the longitudinal direction is an area for joining the terminal tab 13A.

The anode active material layer is, for example, formed by coating the current collector with an anode slurry in which an anode active material, a binding agent to serve as a binder, and, if necessary, a conductive auxiliary agent are dispersed in a solvent. For example, the anode slurry is coated on both surfaces of the current collector at a region of the current collector between both ends thereof in the widthwise direction.

The anode active material is not particularly limited; for example, it is possible to use a carbon material formed of carbon powder, graphite powder or the like, and a metal oxide such as lithium titanate. From the viewpoint that a sheet-laminated lithium ion secondary battery 1 having a higher capacity can be realized, it is preferable to use a silicon-based active material.

As the binding agent, for example, polyvinylidene fluoride or the like can be used. As the conductive auxiliary agent, for example, acetylene black, carbon nanotube or the like can be used.

The terminal tab 13A of the anode sheet 13 is joined to the anode sheet 13 at an end thereof in the longitudinal direction so as to protrude outwardly in the widthwise direction, and is formed, for example, by an aluminum plate or the like. As mentioned above, the terminal tab 13A may protrude in the widthwise direction of the sheet-laminated lithium ion secondary battery 1 as in the example shown in the drawings, or may protrude in the longitudinal direction of the battery 1.

As described above, the electrolyte layer (not shown) is not particularly limited, and may be formed of a solid, liquid or gel material. For example, the electrolyte layer is formed of a gel electrolyte coated on both surfaces of the strip-formed cathode sheet 12 or anode sheet 13, which is disposed in a gelled state on each of the surfaces. The electrolyte layer may be provided on either one of the surfaces of the strip-formed cathode sheet 12 and anode sheet 13, but is more preferably provided on both of the surfaces of the cathode sheet 12 and the anode sheet 13. Alternatively, the electrolyte layer may be formed by pouring a gel electrolyte onto both surfaces of the separator 14.

The gel electrolyte is, for example, formed of a polymer matrix and a non-aqueous electrolyte solution (i.e., a non-aqueous solvent and an electrolyte salt), and those which exhibit adhesiveness on their surfaces upon gelation can be used. Alternatively, as the gel electrolyte, it is also possible to use one which comprises a polymer matrix and a non-aqueous solvent, and is solidified after coating to become a solid electrolyte. In the present embodiment, whichever of the aforementioned electrolytes is used, the gel electrolyte used exhibits adhesiveness when coated on the cathode sheet 12 or the anode sheet 13. Further, it is more preferred that the gel electrolyte forms a self-supporting film that would not be separated from the surface of the cathode sheet 12 or the anode sheet 13.

As the polymer matrix, for example, it is possible to use a polyester, a polyamine, a polyphosphazene, a polysiloxane and the like as well as a polyvinylidene fluoride (PVDF), polyvinylidene fluoride-hexafluoropropylene copolymer (PVDF-HFP), a polyacrylonitrile, and a polyalkylene ether such as polyethylene oxide or polypropylene oxide.

Examples of the non-aqueous solvent include lactone compounds such as γ-butyrolactone; carbonate ester compounds such as ethylene carbonate, propylene carbonate, dimethyl carbonate, diethyl carbonate, and methyl ethyl carbonate; carboxylic acid ester compounds such as methyl formate, methyl acetate, and methyl propionate; ether compounds such as tetrahydrofuran, and dimethoxyethane; nitrile compounds such as acetonitrile; sulfone compounds such as sulfolane; amide compounds such as dimethylformamide. These compounds can be used individually or as a mixture of two or more types.

The electrolyte salt is not particularly limited, and it is possible to use lithium salts such as lithium hexafluorophosphate, lithium perchlorate, lithium tetrafluoroborate and lithium carboxylate.

Since the sheet-laminated lithium ion secondary battery according to the present invention is used while being bent to curve when placed on a position for use, the battery is curved through its entirety; therefore, when the electrolyte layer is formed by a solid or semi-solid electrolyte, it becomes difficult to suppress the displacement between the electrode sheets and the separator. Therefore, it is preferred to use a gel electrolyte layer as the electrolyte layer provided between the cathode sheet 12 and the anode sheet 13 as in the case of the sheet-laminated lithium ion secondary battery 1 described in the present embodiment. Due to the use of such a gel electrolyte layer, even when the sheet-laminated lithium ion secondary battery according to the present invention is installed for use while being bent to curve such that the battery is curved through its entirety, it becomes possible to suppress the displacement between the electrode sheets and the separator. Accordingly, the distance between the electrodes can be maintained uniform more effectively, so that the effect of maintaining and improving the battery performance become more remarkable.

The material of the separator 14 is not particularly limited, and for example, it is possible to use olefin type materials such as polyethylene and polypropylene, and cellulosic materials. A nonwoven fabric, a porous film or the like made of any of these materials can be used as the separator 14. Alternatively, the separator 14 may be a separator formed of a composition including insulating particles of an inorganic material (e.g., $Al_2O_3$, $SiO_2$) and the like and a binder (e.g., polyvinylidene fluoride (PVDF) or lithium polyacrylate). Further, the separator may have a multilayer structure formed by applying a mixture containing insulating particles and a binder to a substrate such as a nonwoven fabric or a porous film.

As mentioned above, in the membrane electrode assembly 10 of the sheet-laminated lithium ion secondary battery 1 of the present invention, a sheet thermoplastic resin layer 16 (16A, 16B) is inserted as at least one of an interlayer between the cathode sheet 12 and the separator 14, and an interlayer between the anode sheet 13 and the separator 14. Thus, since the sheet thermoplastic resin layer 16 is inserted as at least one of an interlayer between the cathode sheet and the separator, and an interlayer between the anode sheet and the separator, even when the battery is bent to curve as shown in FIG. 2, the distance between the electrodes can be kept uniform due to the expansion and contraction of the thermoplastic resin layer 16. As a result, the occurrence of a gap between the electrodes and the separator can be prevented while maintaining the good flexibility of the sheet electrodes, whereby it becomes possible to prevent the electron transfer between the electrodes from being cut off or from being hindered, which results in the improvement of the capacity maintenance property of the battery.

Further, the sheet thermoplastic resin layer 16 in this embodiment is formed of a resin material which is thermoplastic, it possible to omit additional steps such as a drying step differing from the case of using an adhesive, thereby improving the productivity.

Thus, it becomes possible to provide a sheet-laminated lithium ion secondary battery 1 which not only is capable of maintaining a high battery performance, but also can be produced at a low cost and with a high productivity.

In the example shown in FIG. 1A and FIG. 1B, the sheet thermoplastic resin layers 16 (16A, 16B) are respectively inserted both as an interlayer between the cathode sheet 12 and the separator 14, and as an interlayer between the anode sheet 13 and the separator 14; however, the present invention is not limited to such an example. A sufficient effect of maintaining the distance between the electrodes can be achieved as long as the thermoplastic resin layer 16 is provided on either one side of the cathode sheet 12 or the anode sheet 13.

When, for example, the thermoplastic resin layer 16 provided in the sheet-laminated lithium ion secondary battery 1 according to the present embodiment is formed of a material having an ion permeability, the migration of lithium ions between the electrodes are not hindered and an excellent battery performance can be achieved.

As such a thermoplastic resin material having an ion permeability, for example, it is possible to employ a porous polyolefin sheet, a polyolefin-based non-woven, woven or knitted fabric, polyolefin-based particles and the like. Examples of the polyolefin include homopolymers such as polyethylene and polypropylene, and copolymers of an olefin such as ethylene or propylene with other monomers.

The thermoplastic resin may be a resin having introduced therein a polar group derived from a carboxylic acid such as maleic acid. By the presence of a polar group, it becomes possible to impart a crosslinking ability or adhesiveness to the thermoplastic resin.

The thickness of the thermoplastic resin layer 16 is not particularly limited, but is preferably within a range such that it is possible to achieve both of a good flexibility to be exhibited when the sheet-laminated lithium ion secondary battery 1 is bent and a maintenance of the distance between the electrodes. For example, the thickness of the thermoplastic resin layer 16 may be 3 to 150 µm, preferably about 5 to 80 µm, and still more preferably about 7 to 40 µm. If the thickness of the thermoplastic resin layer 16 is within this range, not only can the sheet-laminated lithium ion secondary battery 1 be easily bent, but it also becomes possible to keep the distance between the electrodes uniform.

Figure 3:
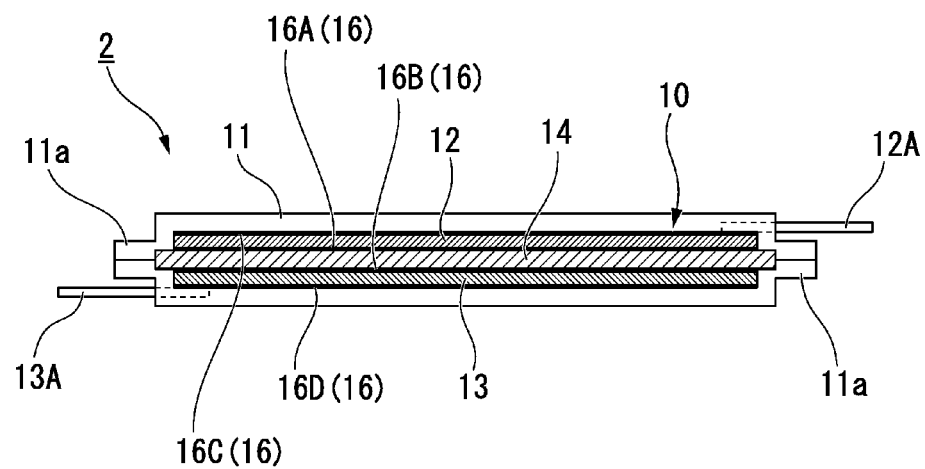
FIG. 3 is a schematic view explanatorily showing another embodiment of the sheet-laminated lithium ion secondary battery of the present invention, and is a cross-sectional view thereof for explaining the layered structure including the thermoplastic resin layer.

In the present embodiment, as in the case of the sheet-laminated lithium ion secondary battery 2 shown in FIG. 3, it is preferable that, in addition to the interlayers between the cathode sheet 12, the anode sheet 13 and the separator 14, the battery has a sheet thermoplastic resin layer 16 inserted as at least one of an interlayer between the cathode sheet 12 and the outer casing 11, and an interlayer between the anode sheet 13 and the outer casing 11, at among interfaces present between the membrane electrode assembly 10 and the outer casing 11. In the example shown in the drawing, a sheet thermoplastic resin layer 16C is inserted as an interlayer between the cathode sheet 12 and the outer casing 11, and a sheet thermoplastic resin layer 16D is inserted as an interlayer between the anode sheet 13 and the outer casing 11.

In the present embodiment, the sheet thermoplastic resin layers 16 (16C, 16D) are also provided between the respective electrode sheets and the outer casing 11; therefore, even when the sheet-laminated lithium ion secondary battery is bent to curve as mentioned above, the distance between the electrodes can be kept uniform, whereby the effect of maintaining the excellent battery performance becomes more remarkable.

In the present embodiment, each of the thermoplastic resin layers 16 described above (16A, 16B, 16C, 16D) is more preferably heat fusion bonded to upper and lower layers.

With each sheet thermoplastic resin layer 16 being heat fusion bonded to upper and lower layers as mentioned above, even when the sheet-laminated lithium ion secondary battery 1,2 is bent to curve, the stress caused by the displacement of the sheets (electrodes and separator) due to winding thereof inside the battery can be alleviated by the elasticity of the sheet thermoplastic resin layer 16. Accordingly, the distance between the electrodes can be maintained uniform more effectively, so that the effect of maintaining the excellent battery performance become more remarkable.

In this embodiment, the aforementioned thermoplastic resin layer 16 may be configured to have through-holes in a plan view though not shown in detail in the drawings. When the thermoplastic resin layers, especially thermoplastic resin layers 16A. 16B provided in contact with the separator 14, have a plurality of through holes, the flow of Li ions between the electrodes is further facilitated by the through-holes, whereby excellent battery performance can be achieved. Further, even when a plurality of through-holes as described above are formed in the thermoplastic resin layer, the effect of maintaining uniform distance between the electrodes can be obtained at positions where the through holes are not formed; therefore, also in this case, a high battery performance can be maintained as described above.

Effect of the Invention

According to the sheet-laminated lithium ion secondary battery 1,2 of the present invention, as mentioned above, the battery has a construction in which a sheet thermoplastic resin layer 16 is inserted as at least one of an interlayer between the cathode sheet 12 and the separator 14, and an interlayer between the anode sheet 13 and the separator 14; therefore, even when the battery 1 is bent to curve, the distance between the electrodes can be kept uniform due to the expansion and contraction of the thermoplastic resin layer 16. As a result, the occurrence of a gap between the electrodes and the separator 14 can be prevented while maintaining the good flexibility of the sheet electrodes, whereby it becomes possible to prevent the electron transfer between the electrodes from being cut off or from being hindered, which results in the improvement of the capacity maintenance property of the battery.

Further, the use of sheet thermoplastic resin layer 16 makes it possible to omit additional steps such as a drying step, thereby improving the productivity.

Thus, it becomes possible to provide a sheet-laminated lithium ion secondary battery 1,2 which not only is capable of maintaining a high battery performance, but also can be produced at a low cost and with a high productivity.

Furthermore, the sheet-laminated lithium ion secondary battery 1, 2 of the present invention can change its outer shape by being bent to curve, such that the outer shape of the battery can be changed flexibly to fit the shape of the place for installation. Accordingly, the sheet-laminated lithium ion secondary battery 1, 2 of the present invention exhibits excellent installability and workability irrespective of the location of installation of the battery.

Further, according to another embodiment of the invention, there is provided a method for producing the aforementioned sheet-laminated lithium ion secondary battery, which comprises a step of heat fusion bonding a sheet thermoplastic resin layer as at least one of an interlayer between the cathode sheet and the separator, and an interlayer between the anode sheet and the separator.

The heat fusion bonding can be carried out by thermocompression bonding at a predetermined temperature under a predetermined pressure. The heat fusion bonding can be carried out by any of conventional methods as long as the layers are fusion bonded through the thermoplastic resin layer. For example, the heat fusion bonding can be carried out by a heat press method.

The conditions for heat fusion bonding are not particularly limited as long as it is possible to bring about a state in which the layers are fusion bonded through the thermoplastic resin layer, and may be appropriately chosen depending on the materials of the electrode sheet, the separator, the thermoplastic resin layer, the outer casing and the like.

Especially preferable conditions for heat fusion bonding are as follows: the heat fusion bonding temperature of 150 to 220° C., the heat fusion bonding pressure of 0.01 MPa or more, and the heat fusion bonding time of 0.1 second or more.

The heat fusion bonding temperature of 150° C. or higher means that the thermoplastic resin would not easily bleed out, and therefore is preferable in that a good heat resistance can be maintained. Further, the heat fusion bonding temperature of 220° C. or less means that the flow of the thermoplastic resin is maintained. The heat fusion bonding temperature is more preferably in the range of 160 to 200° C.

The compression for the heat fusion bonding fusing is generally carried out under a pressure of 0.01 MPa or more, which is suitable for satisfactory heat fusion bonding. The pressure for compression is more preferably not less than 0.05 MPa. The upper limit of the pressure for compression is 10 MPa.

The time for heat fusion bonding is preferably at least 0.1 second, whereby the heat fusion bonding can be performed more favorably. The time for heat fusion bonding is more preferably at least 1 second. The upper limit of the time for heat fusion bonding is preferably 360 seconds.

The configuration of the sheet-laminated lithium ion secondary battery produced by the method of the present invention may be the same as described above with respect to the sheet-laminated lithium ion secondary battery described above. As for the steps other than the step of heat fusion bonding of the sheet thermoplastic resin, such steps can be performed as in the conventional manufacturing method. Further, the members and parts of the sheet-laminated lithium ion secondary battery can be produced by the methods mentioned above for the respective members and parts.

EXAMPLES

Hereinbelow, the present invention will be described in more detail with reference to the Examples which, however, should not be construed as limiting the present invention.

Example 1

In Example 1, a sheet-laminated lithium ion secondary battery of a long shape as shown in FIG. 1A and FIG. 1B was manufactured according to the conditions and procedures described below, and the obtained battery was evaluated.
(Production of Sheet-Laminated Lithium Ion Secondary Battery)

In this Example, firstly, a film-type lithium ion secondary battery of a long shape as shown in FIG. 1A and FIG. 1B, which had a size of 50 mm (width)×600 mm (length)×2 mm (thickness), was manufactured according to the following procedure.

A gel electrolyte was prepared by the following procedure.

First, as a non-aqueous electrolyte solution containing an electrolyte salt, LiPF$_6$ (manufactured by Kishida Chemical Ltd., lithium salt concentration=1 mol/L, solvent=mixed solvent of dimethyl carbonate:ethylene carbonate (2:1, volume ratio)) was used in an amount of 94 parts by mass. Further, as a matrix polymer, PVDF-HFP (copolymer of polyvinylidene fluoride and hexafluoropropylene, manufactured by Sigma-Aldrich Corporation) was used in an amount of 6 parts by mass. Then, the non-aqueous electrolyte solution and the matrix polymer were mixed and stirred for 1 hour while heating at 80° C. using a disperser (T. K. homodisper Model 2.5, manufactured by Primix Corporation) to obtain a gel electrolyte having a viscosity of 1000 Pa·s.

Then, a cathode sheet was produced by the following procedure.

First, 89 parts by weight of a nickel-cobalt-manganese ternary cathode material (NME-1051, manufactured by Toda Kogyo Corporation), 6 parts by mass of PVDF (polyvinylidene fluoride, KF polymer L#1120, manufactured by Kureha Corporation), 5 parts by mass of carbon black (Denka black, manufactured by Denki Kagaku Kogyo K.K.), and 100 parts by mass of N-methylpyrrolidone (NMP) were mixed and stirred for 1 hour using a disperser. The resulting was applied to both surfaces of an aluminum foil of a long shape having a thickness of 20 µm, followed by drying under a reduced pressure (100° C., −0.1 MPa, 10 hours) and subsequent roll pressing. Here, the theoretical capacity is 2 mAh/cm$^2$. One end portion of the aluminum foil in the longitudinal direction thereof was left uncoated, and a terminal tab made of aluminum was ultrasonic bonded to the uncoated portion of the aluminum foil.

An anode sheet was produced by the following procedure.

First, 75 parts by mass of silicon monoxide (manufactured by OSAKA Titanium technologies Co., Ltd.), 15 parts by mass of PI (polyimide: Pyer-ML RC-5019, manufactured by Industrial Summit Technology (I.S.T) Corporation), 5 parts by mass of carbon black (Denka Black, manufactured by Denki Kagaku Kogyo), and 5 parts by mass of carbon nanofibers (VGCF-S, manufactured by Showa Denko K.K.), and 120 parts by mass of N-methylpyrrolidone (NMP) were mixed and stirred for 1 hour using the aforementioned disperser. The resulting was applied to both surfaces of a copper foil of a long shape having a thickness of 20 µm, followed by drying under a reduced pressure (200° C., −0.1 MPa, 10 hours) and subsequent roll pressing. Here, the theoretical capacity is 2.25 mAh/cm$^2$. One end portion of the copper foil in the longitudinal direction thereof was left uncoated, and a terminal tab made of nickel was ultrasonic bonded to the uncoated portion of the copper foil.

A thermoplastic resin layer used in this Example was produced by the following procedure.

A commercially available porous polyolefin sheet made of a thermoplastic resin material having ion permeability, HOP-6 manufactured by Hirose Paper Manufacturing Co. Ltd. (olefin-type; thickness: 29 µm; porosity: 76%) was used as a material. This sheet was processed into the same size as that of the anode of the aforementioned film-type lithium ion secondary battery to thereby produce a thermoplastic resin sheet which would serve as the thermoplastic resin layer.

As a separator, TBL4620 manufactured by Nippon Kodoshi Corporation (cellulose-type; thickness: 20 µm; porosity: 70%) was used, which was processed into a size slightly larger in plan view than the aforementioned anode and the like.

Then, the anode sheet was put on a jig, whereon the thermoplastic resin sheet prepared by the above procedure was placed to serve the thermoplastic resin layer.

On top of the thermoplastic resin layer was placed the separator, on which another thermoplastic resin sheet was placed to serve as another thermoplastic resin layer.

On this thermoplastic resin layer, a cathode sheet was placed to obtain a membrane electrode assembly having a multilayer structure, which was then heat pressed at 180° C. to thereby heat fusion bond the layers. Then, the membrane electrode assembly having a multilayer structure was placed in an outer casing which was a container made by an aluminum laminate, and then the electrolytic solution was injected thereinto. The resulting was heat sealed in vacuo to obtain a sheet-laminated lithium ion secondary battery.
(Evaluation Method)

Firstly, the sheet-laminated lithium ion secondary battery obtained above was tested for the charge/discharge characteristics (cycle characteristics) by carrying out a total of 50 cycles of charging and discharging in the following manner.

Specifically, with respect to the sheet-laminated lithium ion secondary battery, a constant current/constant voltage charging was carried out at 0.2 C (applied current value/rated battery capacity) at 25° C. with the upper limit voltage of 4.2V until the current value dropped to 0.1 C, and then a constant current discharge was carried out at 0.2 C to 2.5V. Thereafter, the charge/discharge cycles were repeated at IC to measure the discharge capacity per 10 cycles, thereby evaluating the capacity maintenance.

Then, the sheet-laminated lithium ion secondary battery having had its initial characteristics evaluated was bent in its longitudinal direction as shown in FIG. 2 such that the battery was curved to be wound about 1.5 turns. The surface of the outer casing of the sheet-laminated lithium ion secondary battery in this state was visually observed, and then the cycle characteristics were evaluated by the same method as mentioned above.

Figure 4:
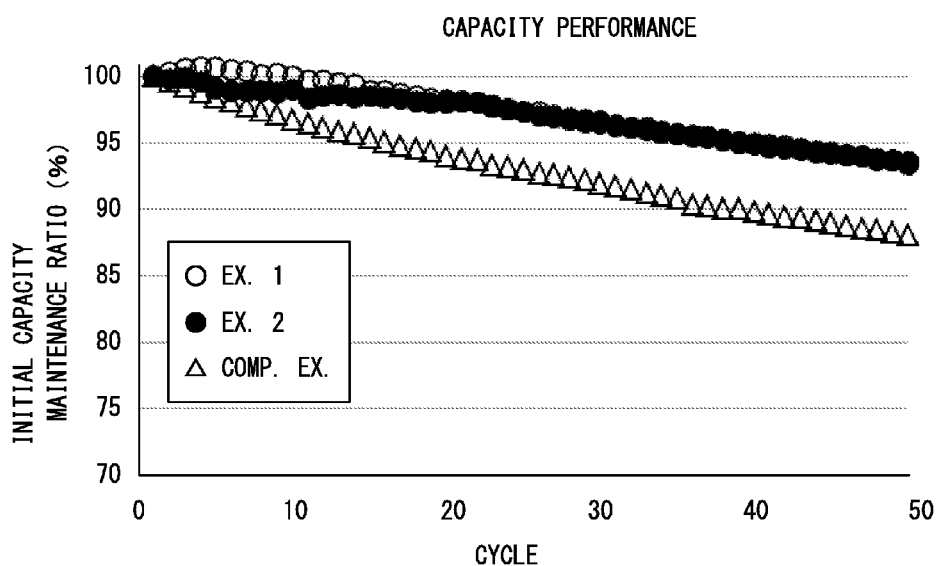
FIG. 4 is a graph showing the capacity performance of the sheet-laminated lithium ion secondary batteries according to one embodiment of the present invention, which are manufactured in the Examples.

The bend angles and the results of evaluation of the surface condition of the outer casings of the sheet-laminated lithium ion secondary batteries in the aforementioned test with the three ratings "Good", "Average" and "Poor" are shown in Table 1 below, while the initial capacity maintenance ratios after each cycle are shown in the graph of FIG. 4.

TABLE 1

| | Bend Angle | | |
|---|---|---|---|
| | 30° | 45° | 90° |
| Example 1 | Good | Good | Average |
| Example 2 | Good | Good | Good |
| Comparative Example | Average | Poor | Poor |

Example 2

In Example 2, a sheet-laminated lithium ion secondary battery was manufactured in the same manner as in Example 1 except that thermoplastic resin layers were also disposed between the cathode sheet and the outer casing, and between the anode sheet and the outer casing, and the obtained battery was evaluated in the same manner in Example 1.

Comparative Example

In this Comparative Example, a sheet-laminated lithium ion secondary battery was manufactured in the same manner as in Example 1 except that a thermoplastic resin layer was not provided, and the obtained battery was evaluated in the same manner in Example 1.

[Results of Evaluation]

With respect to each of the sheet-laminated lithium ion secondary batteries manufactured in Examples 1 and 2, having a construction in which sheet thermoplastic resin layers are inserted as an interlayer between the cathode sheet and the separator, and an interlayer between the anode sheet and the separator, it was confirmed that, as shown in FIG. 2, the curved battery had less bent portions on the surface of the outer casing and the bent portions were also small.

Figure 5:
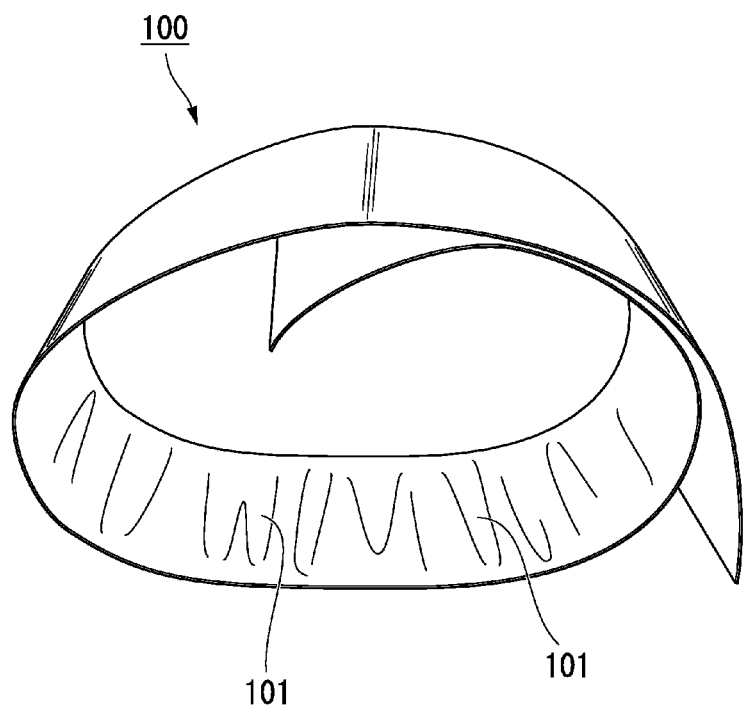
FIG. 5 is a schematic view showing a conventional lithium ion secondary battery in the form of a sheet, which is in a state of being bent to curve.

On the other hand, the sheet-laminated lithium ion secondary battery manufactured in the Comparative Example which had no thermoplastic resin layer had a plurality of large bent portions on the surface of the outer casing as shown in FIG. 5.

Further, as shown in Table 1, the sheet-laminated lithium ion secondary battery of Example 1 had no wrinkles nor bulges even when bent at any of the angles of 30° to 90°, and the overall rating in the evaluation on bending was "Good".

In the case of the sheet-laminated lithium ion secondary battery of Example 2, the battery had no wrinkles when bent at any of the angles of 30° to 90° while bulges occurred locally, so that the overall rating in the evaluation on bending was "Average".

On the other hand, the sheet-laminated lithium ion secondary battery of the Comparative Example had either or both of wrinkles and bulges when bent at any of the angles of 30° to 90°, so that the overall rating in the evaluation on bending was "Poor".

Further, as shown in the graph of FIG. 4, the sheet-laminated lithium ion secondary battery of each of Example 1 and Example 2 suffered only a several percentage of decrease in discharge capacity (50 cycles) even after being curved by bending, which means that no significant change occurred.

On the other hand, the sheet-laminated lithium ion secondary battery of the Comparative Example suffered about 13% decrease in discharge capacity (50 cycles) after being curved by bending, which is a large decrease as compared to Examples 1 and 2.

As apparent from the above, no significant decrease in the cycle characteristics occurred in Examples 1 and 2 even after the sheet-laminated lithium ion secondary battery was curved by bending, whereas a large decrease occurred in Comparative Example. The reason for this is considered that, since the sheet-laminated lithium ion secondary battery of the Comparative Example was not provided with a thermoplastic resin layer at any interfaces between the layers, a delamination occurred between the electrodes and the separator to form gaps therebetween as apparent from the occurrence of large bent portions on the surface of the outer casing, which resulted in deterioration of the cycle characteristics.

The elements, combinations thereof, etc. that are explained above in connection with the specific embodiments and examples of the present invention are mere examples, and various alterations such as addition, omission and substitution of any components, etc. may be made as long as such alterations do not deviate from the gist of the present invention. The present invention should not be limited by the above embodiments and Examples, and is limited only by the annexed claims.

DESCRIPTION OF THE REFERENCE SIGNS

1 Sheet-laminated lithium ion secondary battery
1A One end portion
1B Another end portion
10 Membrane electrode assembly
11 Outer casing
12 Cathode sheet
12A Terminal tab
13 Anode sheet
13A Terminal tab
14 Separator
16,16A,16B,16C,16D Thermoplastic resin layer

What is claimed is:

1. A sheet-laminated lithium ion secondary battery comprising:
a membrane electrode assembly which comprises a cathode sheet comprising a cathode current collector having formed thereon a cathode active material layer, and an anode sheet comprising an anode current collector having formed thereon an anode active material layer, the cathode sheet and the anode sheet being laminated with a separator, the separator being interposed between the cathode sheet and the anode sheet; and
a sheet outer casing having accommodated therein the membrane electrode assembly,
wherein, in the membrane electrode assembly, a sheet thermoplastic resin layer is inserted as at least one of an interlayer between the cathode sheet and the separator, and an interlayer between the anode sheet and the separator, and the sheet thermoplastic resin layer comprises a thermoplastic resin having introduced therein a polar group derived from a carboxylic acid and at least one selected from the group consisting of a porous polyolefin sheet, a polyolefin-based non-woven fabric, a polyolefin-based woven fabric, a polyolefin-based knitted fabric, and polyolefin-based particles.

2. The sheet-laminated lithium ion secondary battery according to claim 1, wherein the thermoplastic resin layer has an ion permeability.

3. The sheet-laminated lithium ion secondary battery according to claim 2, which further comprises a sheet thermoplastic resin layer inserted as at least one of an interlayer between the cathode sheet and the outer casing, and an interlayer between the anode sheet and the outer casing.

4. The sheet-laminated lithium ion secondary battery according to claim 3, wherein the thermoplastic resin layer inserted as the interlayer is heat fusion bonded to upper and lower layers.

5. The sheet-laminated lithium ion secondary battery according to claim 2, wherein the thermoplastic resin layer inserted as the interlayer is heat fusion bonded to upper and lower layers.

6. The sheet-laminated lithium ion secondary battery according to claim 1, further comprising a sheet thermoplastic resin layer inserted as at least one of an interlayer between the cathode sheet and the outer casing, and an interlayer between the anode sheet and the outer casing.

7. The sheet-laminated lithium ion secondary battery according to claim 6, wherein the thermoplastic resin layer inserted as the interlayer is heat fusion bonded to upper and lower layers.

8. The sheet-laminated lithium ion secondary battery according to claim 1, wherein the thermoplastic resin layer inserted as the interlayer is heat fusion bonded to upper and lower layers.

9. A method for producing the sheet-laminated lithium ion secondary battery according to claim 1, comprising heat fusion bonding a sheet thermoplastic resin layer as at least one of an interlayer between the cathode sheet and the separator, and an interlayer between the anode sheet and the separator.

10. The sheet-laminated lithium ion secondary battery according to claim 1, further comprising an electrolyte layer between the cathode sheet and the anode sheet.

11. The sheet-laminated lithium ion secondary battery according to claim 1, wherein the sheet thermoplastic resin layer has through-holes in a plan view.

* * * * *